United States Patent [19]
Ogata et al.

[11] Patent Number: 5,223,280
[45] Date of Patent: Jun. 29, 1993

[54] APPARATUS FOR TAKING RESIDUAL SOLID MATTER OUT OF EXTRUSION HEAD

[75] Inventors: Masayuki Ogata; Eiji Yano, both of Kodaira; Yukio Usui, Kuroiso, all of Japan

[73] Assignee: Bridgestone Corporation, Tokyo, Japan

[21] Appl. No.: 855,495

[22] Filed: Mar. 23, 1992

Related U.S. Application Data

[63] Continuation of Ser. No. 532,780, Jun. 4, 1990, abandoned.

[30] Foreign Application Priority Data

Jun. 13, 1989 [JP] Japan .................................. 1-150307

[51] Int. Cl.⁵ .............................................. B25J 15/00
[52] U.S. Cl. .................................. 425/436 R; 264/39; 264/169; 425/436 RM; 901/31; 901/32; 901/39
[58] Field of Search ............... 425/430, 137, 436 R, 425/436 RM; 264/39, 169; 901/31, 32, 39

[56] References Cited

U.S. PATENT DOCUMENTS

| | | | |
|---|---|---|---|
| 3,306,442 | 2/1967 | Devol | 901/32 |
| 3,422,967 | 1/1969 | Aron | 901/32 |
| 3,525,382 | 8/1970 | Devol | 425/137 |
| 3,631,989 | 1/1972 | McCormick | 901/39 |
| 3,888,362 | 6/1975 | Fletcher et al. | 901/32 |
| 4,257,755 | 3/1981 | Lemelson | 901/31 |
| 4,349,310 | 9/1982 | Schneider et al. | 901/31 |
| 4,368,913 | 1/1983 | Brockmann et al. | 901/39 |
| 4,412,293 | 10/1983 | Kelley et al. | 901/32 |
| 4,428,710 | 1/1984 | Grisebach et al. | 901/31 |
| 4,806,070 | 2/1989 | Poux | 901/39 |

*Primary Examiner*—David A. Simmons
*Assistant Examiner*—William Matney, Jr.
*Attorney, Agent, or Firm*—Sughrue, Mion, Zinn, Macpeak & Seas

[57] ABSTRACT

An apparatus for taking residual solid matter out of an extrusion head of an extruder includes a grasping device for grasping residual solid matter in the extrusion head, and a moving device for moving the grasping device between a grasping position in the extrusion head and an exhausting position on one side of the extrusion head. In order to remove the residual solid matter from the grasping device even if the solid matter firmly adheres to the grasping device, the apparatus further includes a disengaging device for urging the residual solid matter to disengage it from the grasping device when the grasping device has arrived at the exhausting position and released the residual solid matter. A control device is provided for controlling the grasping device, the moving device and the disengaging device.

6 Claims, 4 Drawing Sheets

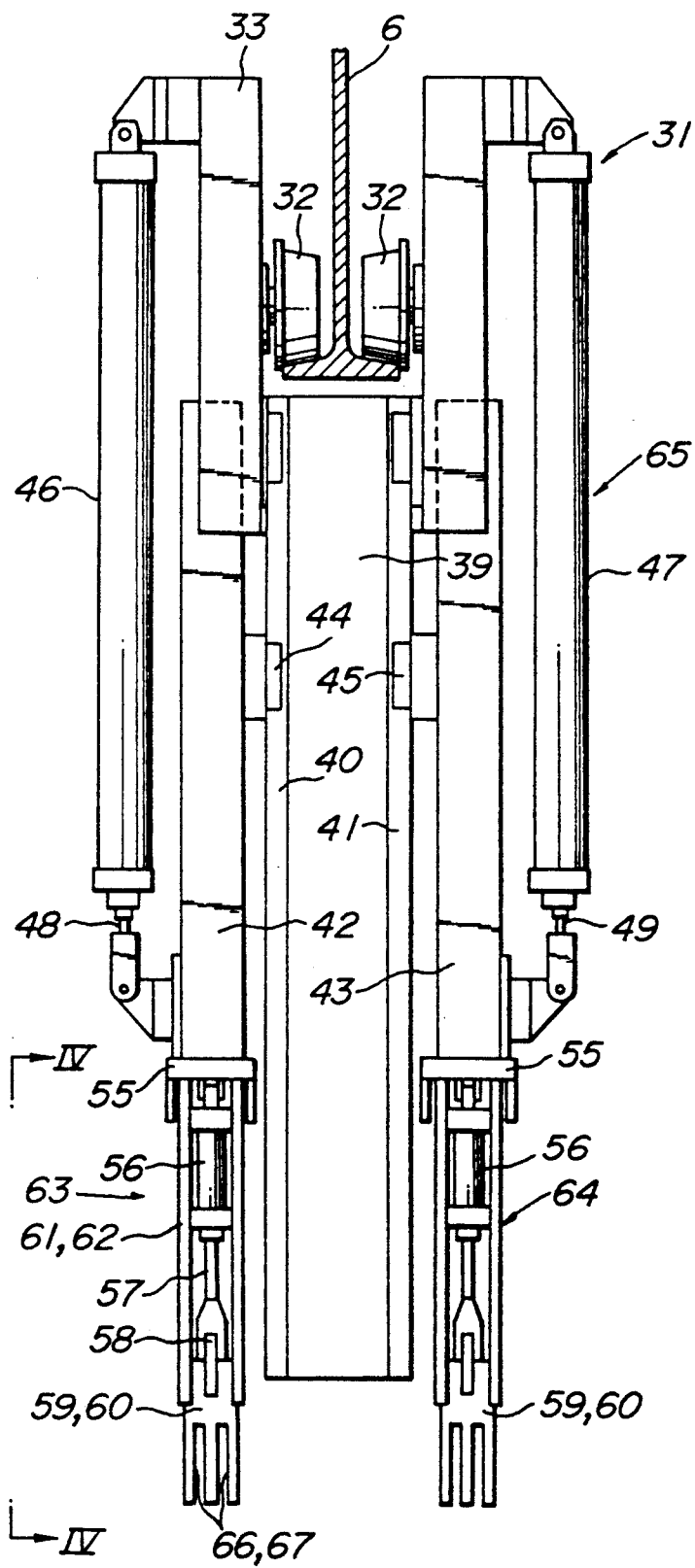
FIG_3

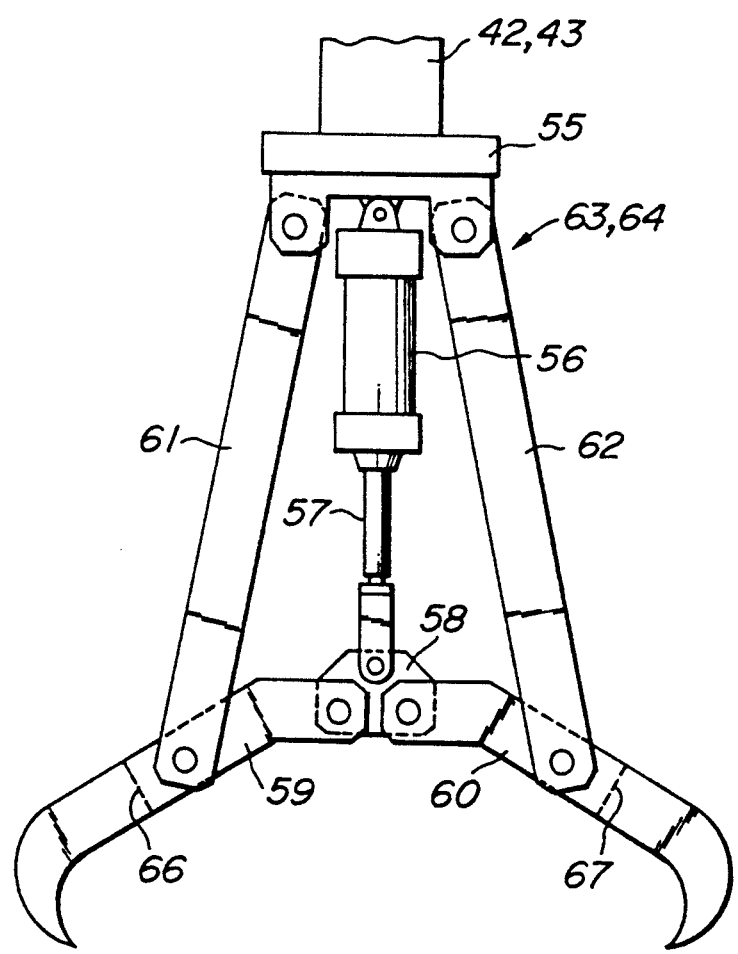
FIG_4

APPARATUS FOR TAKING RESIDUAL SOLID MATTER OUT OF EXTRUSION HEAD

This is a continuation of application Ser. No. 07/532,780 filed Jun. 4, 1990, now abandoned.

BACKGROUND OF THE INVENTION

This invention relates to an apparatus for taking residual solid matter out of an extrusion head.

In tire industries, for example, extruders have been widely used for producing continuous rubber sheets such as treads, side treads and the like. With such extruders, in order to change over types of rubbers to be extruded, after the extruders are once rested, rubber remaining in extrusion heads of the extruders must be removed to clean the inside of the heads.

Up to the present, in order to remove such residual rubber in the extrusion head, after a V-block as a cover is removed from the extrusion head and hanged by a hanging means such as an electric hoist, the hanging means and the V-block are moved to a poised position on one side of the extrusion head. Thereafter, a worker manually removes the residual rubber from the extrusion head, and the V-block is then returned onto the extrusion head.

However, the removal of the rubber from the extrusion head in this manner is generally time-consuming and a troublesome operation because of the residual rubber firmly adhering to the extrusion head and being of unexpectedly massive size. Therefore, such a manual removal imperatively lowers the efficiency of productivity and urges the worker to do heavy work.

SUMMARY OF THE INVENTION

It is an object of the invention to provide an improved apparatus for taking residual solid matter out of an extrusion head, which is able to remove the residual solid matter within a short time with ease to improve the productivity and lighten the burden of a worker.

In order to accomplish the object, the apparatus for taking residual solid matter out of an extrusion head according to the invention comprises grasping means for grasping residual solid matter in the extrusion head, moving means for moving the grasping means between a grasping position in the extrusion head and an exhausting position on one side of the extrusion head, disengaging means for urging the residual solid matter to disengage it from the grasping means when the grasping means has arrived at the exhausting position and released the residual solid matter, and control means for controlling the grasping means, the moving means and the disengaging means.

In order to take the residual solid matter out of the extrusion head, the following operation is performed with the apparatus according to the invention. After a cover is removed from the extrusion head to open it, the grasping means is moved to the grasping position in the extrusion head by means of the moving means. The residual matter is then grasped by the grasping means and the grasping means is then moved away from the extrusion head by the moving means. In this case, even if the residual matter is massive and firmly adhering to the extrusion head, the residual matter can be reliably and easily removed from the extrusion head inasmuch as the grasping means is forcedly moved by the moving means.

Then, the grasping means grasping the residual solid matter is moved to the exhausting position by the moving means. After the grasping means has arrived at the exhausting position, the residual solid matter is released and disengaged from the grasping means. If the residual solid matter firmly adheres to the grasping means, it may be difficult to disengage the solid matter from the grasping means. To solve this problem, the disengaging means applies a force to the solid matter to disengage it from the grasping means with a great certainty. All the operations of the grasping means, the moving means and disengaging means are controlled by the control means. As a result, a worker for extrusion is free from an operation for taking residual solid matters out of the extrusion head so that the productivity of the tire building is improved and the burden on the worker is lightened.

The invention will be more fully understood by referring to the following detailed specification and claims taken in connection with the appended drawings.

BRIEF DESCRIPTION OF THE DRAWINGS

FIG. 3 is a view illustrating grasping means of the apparatus viewed in directions of arrows III in FIG. 1; and FIG. 4 is a view illustrating the grasping means viewed in directions of arrows IV in FIG. 3.

EXPLANATION OF THE PREFERRED EMBODIMENT

Figure 1:
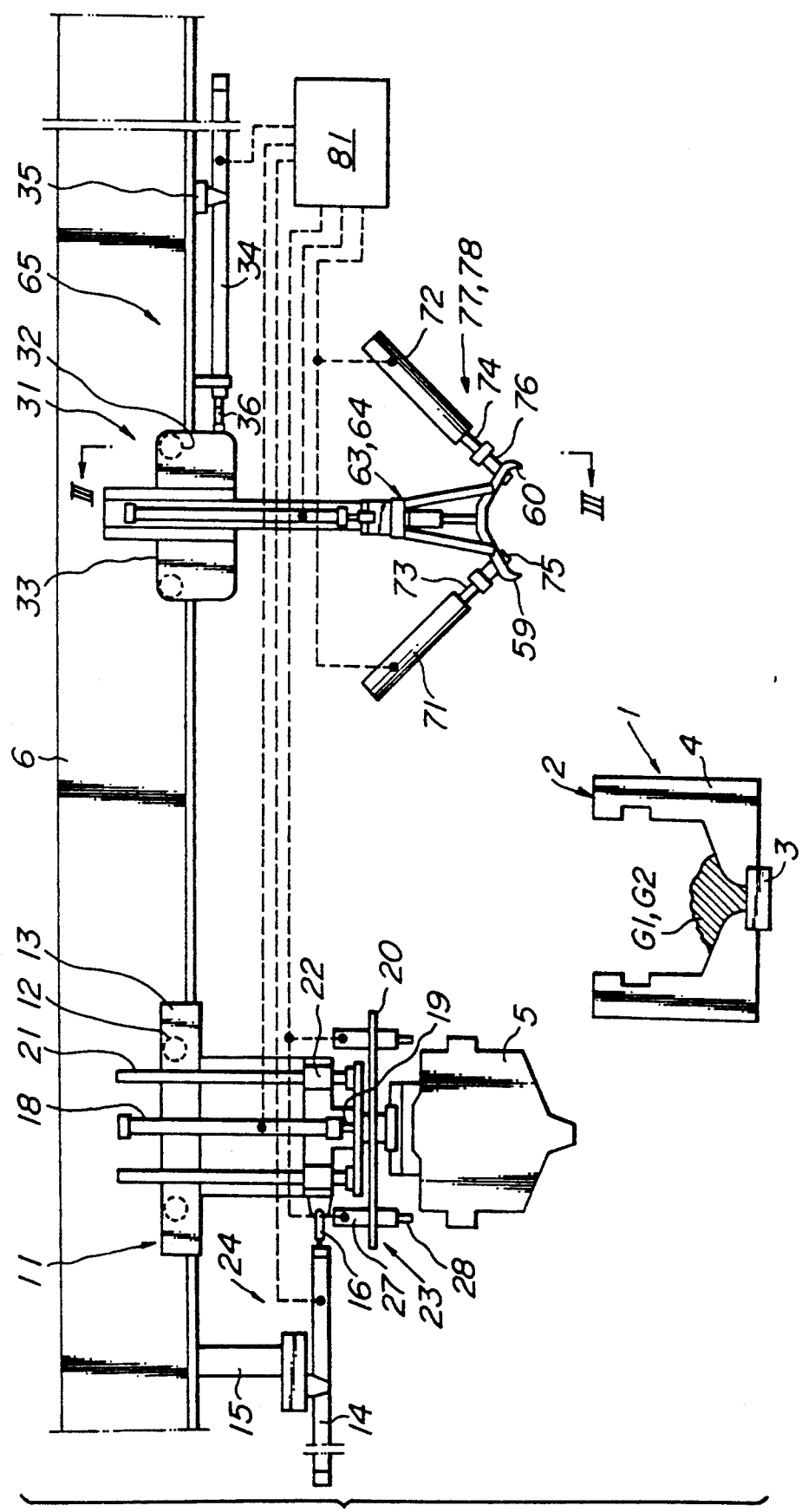
FIG. 1 is a schematic front elevation illustrating one embodiment of the apparatus according to the invention.
Figure 2:
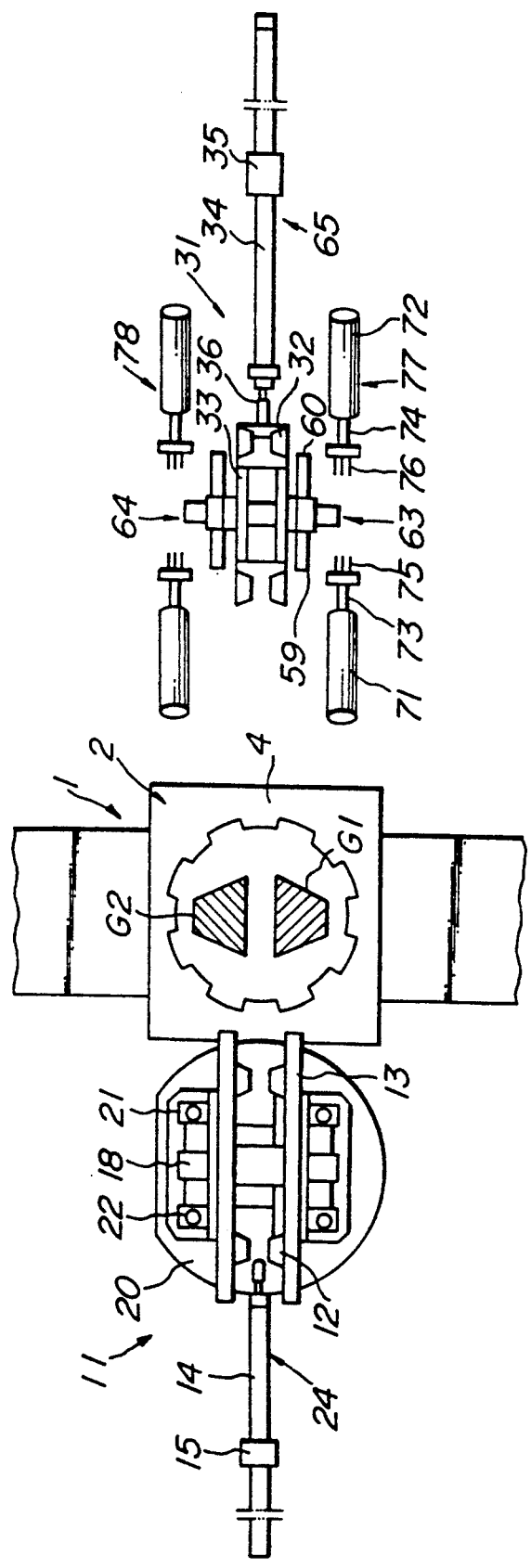
FIG. 2 is a schematic plan view of the apparatus shown in FIG. 1.

Referring to FIGS. 1 and 2, an opposed type extruder 1 has an extrusion head 2 to which different kinds of rubber are supplied from both sides thereof by a screw (not shown) of the extruder 1. The rubber supplied to the extrusion head 2 are extruded through dies 3 to form a continuous rubber sheet such as a tread, side tread or the like. The extrusion head 2 has a main body 4 and a V-block 5 as a cover detachably secured to the main body 4 to form a rubber path between the V-block 5 and the main body 4. As a result, when the V-block 5 is removed from the main body 4, the rubber path is exposed to be available. Different kinds of rubber G1 and G2 reside in the rubber path as residual solid materials. A horizontal rail 6 is arranged above the extruder 1 and extending in a direction intersecting the opposed type extruder 1.

Removing means 11 for removing the V-block 5 from the extrusion head 2 has a trolley 13 provided with a plurality of rollers 12 adapted to roll on the rail 6. A cylinder 14 is secured through a bracket 15 to the rail 6 and extending in parallel with the rail 6 on one side of the extruder 1. A rod end of a piston rod 16 of the cylinder 14 is connected to the trolley 13. Therefore, when the cylinder 14 is actuated, the trolley 13 is moved along the rail 6 between a position directly above the extrusion head 2 and a position on one side of the extrusion head 2.

The trolley 13 is connected to a vertical cylinder 18 having a piston rod 19 whose rod end has a support member 20 connected thereto. To the support member 20 are fixed a plurality of guide rod 21 in parallel with the cylinder 18. The guide rods 21 extend through a guide sleeve 22 secured to the movable trolley 13.

Moreover, the support member 20 is provided with a hook (not shown) for hanging the V-block thereon and holding it thereat. When the cylinder 18 is actuated, the support member 20 and the hook are raised or lowered guided by the guide rods 21 and the guide sleeves 22. The support member 20 and the hook form as a whole holding means 23 for holding the V-block 5. The holding means 23 are moved upon operating the cylinders 14 and 18 between a removing position where the V-block 5 is removed from the extrusion head 2 and a poising position spaced on one side from the extrusion head 2. The cylinders 14 and 18 form as a whole driving means 24 for moving the holding means 23.

The support member 20 is provided in the proximity of its outer periphery with plural (three in this embodiment) vertical cylinders 27 as peeling means. With the holding means 23 being in the removing position, when the piston rods 28 of these cylinders 27 are extended, rod ends of the piston rods 28 abut against an upper surface of the extrusion head 2. As a result, the reaction of the abutting force is transmitted through the cylinders 27 to the holding means 23 to raise the holding means 23 together with the V-block 5. Therefore, the V-block 5 is removed from the residual rubbers G1 and G2 adhering to the V-block 5.

Referring to FIGS. 1, 2, 3 and 4, taking-out means 31 for taking the residual rubbers G1 and G2 out of the extrusion head 2 comprises a movable trolley 33 having a plurality of rollers 32 rolling on the rail 6. A cylinder 34 in parallel with the rail 6 is mounted onto the rail 6 by means of a bracket 35 on the other side of the extruder 1 with respect to the taking-out means 31. A rod end of a piston rod of the cylinder 34 is connected to the trolley 33. As a result, when the cylinder 34 is actuated, the trolley 33 is moved along the rail 6 between a position immediately above the extrusion head 2 and a position on the other side of the extrusion head 2.

The movable trolley 33 has a vertical beam 39 vertically extending referring to FIG. 3. Vertically extending guide rails 40 and 41 are fixed on both side faces of the vertical beam 39. Lifting members 42 and 43 are arranged in parallel with the vertical beam 39 and have a plurality of slide bearings 44 and 45 mounted thereonto and adapted to slidably engage the guide rails 40 and 41. Cylinders 46 and 47 are provided in parallel with the vertical beam 39 and have head ends connected to the movable trolley 33 and piston rods 48 and 49 whose rod ends are connected to the lifting members, respectively. As a result, when the cylinders 46 and 47 are actuated, the lifting members 42 and 43 are raised or lowered together with grasping means later described along the guide rails 40 and 41.

To lower ends of the lifting members 42 and 43 are fixed connecting members 55, respectively, to which are connected head ends of cylinders 56 having piston rods 57. Connecting plates 58 are secured to rod ends of the piston rods 57. To each of the connecting plates 58 are rotatably connected bottom ends of a pair of grasping pawls 59 and 60. Moreover, to each of the connecting members 55 are connected upper ends of transmission links 61 and 62 whose lower ends are connected to centers of the grasping pawls 59 and 60, respectively. As a result, when the cylinders 56 are actuated, the grasping pawls 59 and 60 are rocked about their bottom ends to close and open.

Free ends of the grasping pawls 59 and 60 are curved inwardly and tapered off in order to enable them to securely grasp the residual rubbers G1 and G2. The connecting members 55, cylinders 56, the grasping pawls 59 and 60 and the transmission links 61 and 62 form as a whole a pair of grasping means 63 and 64 for grasping the residual rubbers G1 and G2 in the extrusion head 2. These grasping means 63 and 64 move in unison by moving means 65 consisting of the cylinders 34, 46 and 47 between a grasping position in the extrusion head 2 and an exhausting position on the other side of the extrusion head 2 and immediately above an exhausting conveyor (not shown).

The grasping pawls 59 and 60 are formed in free ends with a plurality of slits 66 and 67 extending in longitudinal directions. A pair of cylinders 71 and 72 are provided in the proximity of the grasping means 63 and arranged so that their piston rods 73 and 74 are inclined approaching their rod ends toward each other when extended. A plurality of abutting plates 75 and 76 are fixed to the rod ends of the piston rods 73 and 74 and adapted to be inserted into the slits 66 and 67 of the grasping pawls 59 and 60 by actuating the cylinders 71 and 72. When the abutting plates 75 and 76 are inserted in the slits 66 and 67, the residual rubber G1, if any, adhering to the grasping means 63 are impacted by the abutting plates 75 and 76 to be removed from the grasping means 63. In this manner, the residual rubber is disengaged from the grasping means 63. The cylinders 71 and 72 and the abutting plates 75 and 76 form as a whole disengaging means 77. Disengaging means 78 similar in construction to the disengaging means 77 is also provided in the proximity of the grasping means 64 for disengaging the residual rubber G2 adhering to the grasping means 64 therefrom by imparting impact to the rubber G2.

These disengaging means 77 and 78 are retracted leaving the moving passages of the grasping means 63 and 64. However, when the grasping means 63 and 64 grasping the residual rubbers G1 and G2 are moving toward the exhausting position, the disengaging means 77 and 78 are moved toward the moving passages of the grasping means 63 and 64 and toward each other. Control means 81 is provided to feed control signals to the grasping means 63 and 64, the moving means 65, disengaging means 77 and 78 and the holding means 23 and the driving means 24 in predetermined timing to control operations of these means.

The operation of the apparatus of the embodiment above described according to the invention will be explained hereinafter.

It is now assumed that different kinds of rubber are being supplied into the extrusion head 2 by the screw of the extruder 1 and rubber sheets made of these rubber materials are being extruded from the extrusion head 2 continuously. If it is required to change kinds of rubber, the rubbers in the extrusion head 2 must be completely taken out of the head 2 to make it empty in order to avoid mixture of different kinds of the rubber.

For this purpose, after the extruder 1 is stopped, the V-block 5 is released from the lock of the main body 4. The piston rods 28 of the cylinders 27 are then extended to urge the rod ends of the piston rods 28 against the upper surface of the extrusion head 2. Therefore, reaction of the urging force acts upon the holding means 23 through the cylinders 27 so that the holding means 23 is slightly raised together with the V-block 5. As a result, the V-block 5 is disengaged from the residual rubber adhering thereto in the extrusion head 2.

The piston rod 19 of the cylinder 18 is then retracted to raise the holding means 23 holding the V-block 5.

Thereafter, the piston rod 16 of the cylinder 14 is retracted to move the movable trolley 13 onto one side of the extrusion head 2. As a result, the V-block 5 and the holding means 23 are moved to the poising position where the V-block 5 is waiting for a next actuation. At the moment, the piston rods 28 of the cylinders 27 are retracted.

By removing the V-block 5 from the extrusion head 2 in this manner, the extrusion head 2 is opened to expose the rubber materials G1 and G2 remaining in the extrusion head 2. The piston rod 36 of the cylinder 34 is then extended to move the grasping means 63 and 64 to the position immediately above the extrusion head 2. Thereafter, the piston rods 48 and 49 of the cylinders 46 and 47 are extended in synchronism with the each other to move the grasping means 63 and 64 to the grasping positions in the extrusion head 2. The piston rods 57 of the cylinders 56 are then retracted by actuating the cylinders 56 of the grasping means 63 and 64. As a result, the grasping pawls 59 and 60 of the grasping means 63 and 64 are closed to grasp the residual rubbers G1 and G2 on both sides in the extrusion head 2.

The piston rods 48 and 49 of the cylinders 46 and 47 are then retracted so that the grasping means 63 and 64 grasping the residual rubber materials G1 and G2 are raised upwardly from the grasping positions to disengage from the extrusion head 2. In this case, even if the residual rubber materials G1 and G2 are massive and firmly attached to the extrusion head 2 by their strong adhesive force, the residual rubber materials G1 and G2 are reliably and easily removed from the extrusion head 2 inasmuch as the grasping means 63 and 64 are forcedly raised by the cylinders 46 and 47.

The piston rods 36 of the cylinder 34 are then retracted to move the grasping means 63 and 64 grasping the residual rubber materials G1 and G2 to the exhaust position. When the grasping means 63 and 64 have arrived at the exhausting position, the cylinders 56 of the grasping means 63 and 64 are actuated to extend the piston rods 57, thereby opening the grasping pawls 59 and 60 of the grasping means 63 and 64.

Therefore, the residual rubber materials G1 and G2 are released from the grasping of the grasping means 63 and 64 so that the rubber materials G1 and G2 disengage from the grasping means 63 and 64 to fall onto the exhausting conveyor. If the residual rubber materials G1 and G2 adhere to the grasping means 63 and 64, the rubber materials G1 and G2 do not frequently disengage from the grasping means 63 and 64 only by opening the grasping pawls 59 and 60. In such a case, the disengaging means 77 and 78 are moved toward each other to the positions where the disengaging means overlap the grasping means 63 and 64. Thereafter, the piston rods 73 and 74 of the cylinders 71 and 72 of the disengaging means 77 and 78 are extended. As a result, the abutting plates 75 and 76 pass through the slits 66 and 67 of the grasping pawls 59 and 60 and abut against the residual rubber materials G1 and G2 to impact the rubber materials and G2, thereby positively disengaging the rubber materials and G2 from the grasping means 63 and 64. The residual rubber materials and G2 thus taken out of the head ar then transferred to the exhausting conveyor and then transferred to a station by the exhausting conveyor. As these rubbers are of the different types of material, they are required to be taken out of the head and transferred, separately.

The cylinders 14 and 18 are then actuated to move the holding means 23 and the V-block 5 from the poised position to the removing position. Thereafter, the holding means 23 and the V-block 5 are locked to the main body 4. At this moment, the cylinders 71 and 72 of the disengaging means 77 and 78 are actuated to return the abutting plates 75 and 76 to the initial positions. In order to control the various cylinders, the control means 81 feed control signals to the cylinders 14 and 18 of the driving means 24, the cylinders 27 of the holding means 23, the cylinders 34, 46 and 47 of the moving means 65, the cylinders 56 of the grasping means 63 and 64 and the cylinders 71 and 72 of the disengaging means 77 and 78. As a result, a worker for extrusion is free from an operation for taking residual solids G1 and G2 out of the head so that the productivity of tire building is improved and the burden on workers is lightened.

The holding means 23 may be poised remote from a position above the main body 4 rather than immediately above the main body 4. Although the residual materials are explained as rubber in the above embodiment, they may be plastic materials, foods and the like.

As can be seen from the above explanation, according to the invention residual solid matters in an extrusion head can be easily removed for a short time to improve the productivity of tire building and lighten the burden on workers for extrusion.

While the invention has been particularly shown and described with reference to preferred embodiments thereof, it will be understood by those skilled in the art that the foregoing and other changes in form and details can be made therein without departing from the spirit and scope of the invention.

I claim:

1. An apparatus for removing residual solid matter out of an extrusion head having a main body with an inner space and a removable cover element, said apparatus comprising; means for removing said cover element from said main body to provide access to said inner space; grasping means for grasping residual solid matter in the inner space of said extrusion head, said grasping means having pawls with sharp tips to pierce and grasp said solid matter, moving means for moving the grasping means between a grasping position in the extrusion head and a release position on one side of the extrusion head, disengaging means for urging the residual solid matter by pushing the solid matter attached to said pawls to disengage it from the grasping means when the grasping means has arrived at the release position and released the residual solid matter, and control means for controlling the grasping means, the moving means and the disengaging means.

2. An apparatus as set forth in claim 1, wherein said grasping means comprises a connecting member for connecting the grasping means to the moving means, a cylinder whose cylinder head is pivotally connected to the connecting member and a piston rod end is pivotally connected to a connecting plate, said pawls comprising a pair of grasping pawls whose bottom ends are pivotally connected to the connecting plate, and transmission links whose one ends are pivotally connected to the connecting member and the other ends are pivotally connected to substantial centers of the grasping pawls.

3. An apparatus as set forth in claim 1, wherein said moving means comprises a trolley for hanging the grasping means and movable along a horizontal rail, a horizontal cylinder for horizontally moving the trolley by extending and retracting a piston rod of the horizontal cylinder, and at least one vertical cylinder for vertically moving the grasping means by extending and retracting a piston rod of the vertical cylinder.

4. An apparatus as set forth in claim 1, wherein the grasping means is formed with a plurality of slits extending in longitudinal directions thereof, and the disengaging means comprises a pair of extendable rods inclined approaching their rod ends toward each other when extended, and a plurality of abutting plates fixed to the rod ends to be inserted into the slits of the grasping means when the rods are extended.

5. Apparatus as set forth in claim 1, wherein the grasping means has two pairs of pawls side-by-side, each pair of pawls grips different residual solid matter in the extrusion head at the same time.

6. Apparatus as set forth in claim 1, wherein said pawls of said grasping means comprises tips curved inwardly and tapered off to securely grasp said solid matter.

* * * * *